US012699164B2

(12) United States Patent　(10) Patent No.: US 12,699,164 B2
Silander　(45) Date of Patent: Aug. 4, 2026

(54) MONOSTATIC RADAR SYSTEM

(71) Applicant: SAAB AB, Linköping (SE)

(72) Inventor: Anders Silander, Gothenburg (SE)

(73) Assignee: SAAB AB, Linköping (SE)

( * ) Notice: Subject to any disclaimer, the term of this patent is extended or adjusted under 35 U.S.C. 154(b) by 413 days.

(21) Appl. No.: 18/260,049

(22) PCT Filed: Jan. 7, 2022

(86) PCT No.: PCT/SE2022/050004
§ 371 (c)(1),
(2) Date: Jun. 30, 2023

(87) PCT Pub. No.: WO2022/150006
PCT Pub. Date: Jul. 14, 2022

(65) Prior Publication Data
US 2024/0012105 A1　Jan. 11, 2024

(30) Foreign Application Priority Data
Jan. 8, 2021　(SE) .................................... 2100004-7

(51) Int. Cl.
*G01S 7/35*　(2006.01)
(52) U.S. Cl.
CPC .................................... *G01S 7/354* (2013.01)
(58) Field of Classification Search
CPC .......... G01S 7/032; G01S 7/40; G01S 7/4017; G01S 7/4021; G01S 7/4004
USPC .................................. 342/195, 174, 103, 165
See application file for complete search history.

(56) References Cited

U.S. PATENT DOCUMENTS

| | | | | | |
|---|---|---|---|---|---|
| 4,122,448 | A | * | 10/1978 | Martin | .................... G01S 7/288 342/194 |
| 5,661,439 | A | * | 8/1997 | Watkins | .................... H03B 1/04 331/1 R |
| 5,952,834 | A | * | 9/1999 | Buckley | ................. G01R 29/26 324/76.27 |

(Continued)

FOREIGN PATENT DOCUMENTS

| | | |
|---|---|---|
| KR | 20140012809 A | 2/2014 |
| KR | 20160088644 A | 7/2016 |

OTHER PUBLICATIONS

Nalezinski, M., t al.; "Navel 24 GHz FMCW Front-End with 2.45 GHz SAW Reference Path for High-Precision Distance Measurements"; IEEE MTT-S International Microwave Symposium Digest; Jun. 8-13, 1997; Denver, CO, USA; pp. 185-188 (4 pages).

(Continued)

*Primary Examiner* — Michael W Justice
(74) *Attorney, Agent, or Firm* — Sage Patent Group

(57)　ABSTRACT

The present disclosure relates to a monostatic radar system comprising a radar module comprising a transmitter, a receiver, and a signal processing unit. Further comprising a phase noise controller comprising an analog-to-digital converter, ADC. Further comprising an RF oscillator configured to transmit RF oscillator signals to said phase noise controller and said radar module, wherein the radar module is configured to transmit at least a first radar signal into an environment, wherein the radar signal is based on the RF oscillator signal, receive at least a second radar signal formed by reflections of the first radar signal from at least one object in said environment.

12 Claims, 6 Drawing Sheets

(56)                References Cited

U.S. PATENT DOCUMENTS

| 6,057,690 | A | * | 5/2000 | Buckley | G01R 29/26 |
| | | | | | 324/76.23 |
| 6,480,006 | B1 | * | 11/2002 | Buckley | G01R 29/26 |
| | | | | | 324/76.23 |
| 7,298,315 | B2 | * | 11/2007 | Gerlach | G01S 7/292 |
| | | | | | 342/194 |
| 8,248,297 | B1 | * | 8/2012 | Baker | G01S 7/4052 |
| | | | | | 342/174 |
| 8,866,667 | B2 | * | 10/2014 | Vacanti | G01S 13/882 |
| | | | | | 342/120 |
| 9,658,325 | B2 | * | 5/2017 | Harvey | G01S 13/26 |
| 9,678,197 | B2 | * | 6/2017 | Vacanti | G01S 13/882 |
| 11,726,174 | B1 | * | 8/2023 | Campbell | G01S 7/354 |
| | | | | | 342/70 |
| 2006/0097908 | A1 | * | 5/2006 | Gerlach | G01S 7/292 |
| | | | | | 342/194 |
| 2009/0251361 | A1 | * | 10/2009 | Beasley | G01S 7/4056 |
| | | | | | 342/194 |
| 2010/0237958 | A1 | * | 9/2010 | Goel | H03L 7/099 |
| | | | | | 331/135 |
| 2012/0154203 | A1 | * | 6/2012 | Vacanti | G01S 13/44 |
| | | | | | 342/149 |
| 2013/0214963 | A1 | * | 8/2013 | Vacanti | G01S 7/354 |
| | | | | | 342/120 |
| 2015/0084808 | A1 | * | 3/2015 | Vacanti | G01S 13/343 |
| | | | | | 342/128 |
| 2016/0033630 | A1 | * | 2/2016 | Harvey | G01S 13/781 |
| | | | | | 342/43 |
| 2016/0077196 | A1 | * | 3/2016 | Dehlink | G01R 31/2822 |
| | | | | | 342/169 |
| 2017/0199270 | A1 | * | 7/2017 | Huemer | G01S 13/343 |
| 2018/0329031 | A1 | * | 11/2018 | Cheung | G01S 13/34 |
| 2019/0195994 | A1 | * | 6/2019 | Orchard | G01S 7/354 |
| 2021/0013889 | A1 | * | 1/2021 | Fala | H03L 7/18 |
| 2021/0302558 | A1 | * | 9/2021 | Peng | G01S 13/58 |

OTHER PUBLICATIONS

Bucciarelli, T., et al.; "Clutters Cancellation Using Autoregressive Techniques"; ICASSP '84. IEEE International Conference on Acoustics, Speech, and Signal Processing; Mar. 19-21, 1984; San Diego, CA, USA; 4 pages.

Ayhan, S., et al., "Impact of Frequency Ramp Nonlinearity, Phase Noise, and SNR on FMCW Radar Accuracy,"; IEEE Transactions on Microwave Theory and Techniques, vol. 64, No. 10, Oct. 2016, pp. 3290-3301 (12 pages).

International Search Report and Written Opinion mailed Jan. 31, 2022 for International Application No. PCT/SE2022/050004, 16 pages.

International Preliminary Report on Patentability mailed Feb. 3 15, 2023 for International Application No. PCT/SE2022/050004, 7 pages.

Office Action and Search Report mailed Sep. 28, 2021 for Swedish Application No. 2100004-7, 9 pages.

Extended European Search Report mailed Oct. 23, 2024 for European Patent Application No. 22736959.2, 12 pages.

* cited by examiner

100

200

MONOSTATIC RADAR SYSTEM

CROSS-REFERENCE TO RELATED APPLICATIONS

This application is a 35 U.S.C § 371 national stage application for International Application No. PCT/SE2022/050004, entitled "A MONOSTATIC RADAR SYSTEM", filed on Jan. 7, 2022, which claims priority to Swedish Patent Application No. 2100004-7, filed on Jan. 8, 2021, the disclosures and contents of which are hereby incorporated by reference in their entireties.

TECHNICAL FIELD

The present disclosure relates to a monostatic radar system comprising a radar module having a transmitter, a receiver and a signal processing unit. Further, the system comprises a phase noise controller comprising an analog-to-digital converter.

BACKGROUND ART

Radar systems are known in the art and are used to detect the range and velocity of nearby targets in an environment and are applied in several applications such as target detection, air traffic control, navigation, automotive. There exist several types of radar systems such as bistatic radar systems, multistatic radar systems and monostatic radar systems. In a monostatic radar system the receiver and the transmitter are collocated and usually form the same piece in a radar equipment.

Phase noise is the instability of an oscillator/clock signal source with respect to frequency and phase. It can be defined by the noise arising from phase fluctuations that occur in a signal. It is an undesirable characteristic that negatively affects the performance of radar systems. Thus, the performance of radar systems suffer from phase noise in oscillators. Phase noise can reduce the radar performance in several ways e.g. for target detection in the presence of clutter, in the detection of multiple targets, and in parameter estimation.

There is a need for radar systems in general, and particularly monostatic radar systems to provide means to cancel or at least reduce the phase noise. Further, there is a need to provide phase noise cancelling in a radar system in an efficient manner so to not increase the product cost of the radar system.

Thus, there is room in the present art to explore the domain of providing a radar system that cancels or at least reduces phase noise. There is specifically room in the present art of improving a radar system to be able to provide a radar system having a low product-cost and means for cancelling or at least reducing the phase noise of the radar system. Accordingly, there is a need for improvements in the art to provide means for such radar systems.

Even though previous solutions work well in some situations it would be desirable to provide a radar system that address requirements related to phase noise cancelling while having a low product cost, hence there is a need for further improvements.

SUMMARY

It is an object of the present disclosure to provide a monostatic radar system, a method for supressing phase noise in a monostatic radar system and a vehicle to mitigate, alleviate or eliminate one or more of the above-identified deficiencies and disadvantages.

This object is achieved by means of providing a monostatic radar system, a method and a vehicle as defined in the appended claims.

The present disclosure is at least partly based on the insight that by providing an improved radar system having a phase noise controller, the radar system will have a considerably lower residual phase noise, enhanced performance of target detection in the presence of clutter, detection of multiple targets and target parameter estimation.

In accordance with the present disclosure there is provided a radar system according to claim 1, a method for supressing phase noise in a radar system according to claim 10 and a vehicle according to claim 9.

The present disclosure provides a (monostatic) radar system for supressing phase noise arising from an RF oscillator comprising a radar module comprising a transmitter, a receiver, and a signal processing unit. The radar system further comprises a phase noise controller comprising an analog-to-digital converter, ADC. Further, the radar system comprises an RF oscillator configured to transmit RF oscillator signals to said phase noise controller and said radar module. The radar module is configured to transmit at least a first radar signal into an environment, wherein the radar signal is based on the RF oscillator signal. The radar module is further configured to receive at least a second radar signal formed by reflections of the first radar signal from at least one object in said environment. The phase noise controller is further configured to duplicate the RF oscillator signal, delay the duplicated RF oscillator signal by a time period, mix the RF oscillator signal and the delayed duplicated RF oscillator signal, so to obtain a combined RF oscillator signal, digitize the combined RF oscillator signal by means of the ADC. Lastly, the signal processing unit is configured to obtain at least the second radar signal and the combined RF oscillator signal and supress the phase noise of the second radar signal based on the combined RF oscillator signal.

A benefit of the proposed radar system is that the second radar signal has a residual phase noise that is cancelled/considerably smaller than before and hence, problems related to phase noise are smaller. More specifically, there is an enhanced performance of target detection in the presence of clutter, detection of multiple targets and target parameter estimation. Further, small target detection will be improved by the radar system disclosed herein. Also, the radar system according to the present disclosure relaxes the requirements on the RF oscillator itself, e.g. mechanical vibration is not as detrimental to the performance of the radar system of the present disclosure. In other words, the radar system in accordance with the present disclosure may beneficially be mounted on a vehicle or any other moving platform that causes mechanical vibrations of the oscillator which will increase phase noise.

The phase noise controller may further comprise a first mixer unit, wherein the first mixer unit is configured to mix the RF oscillator signal and the delayed duplicated RF oscillator signal, so to obtain the combined RF oscillator/phase noise difference signal. Thus, the RF oscillator signal and the delayed duplicated RF oscillator signal may be mixed by means of the first mixer unit. It should be noted that the present system is for supressing phase noise arising from the RF oscillator. Accordingly, the phase noise controller is configured to receive a raw RF oscillator signal from the RF oscillator. So to allow for supressing the phase noise arising from the RF oscillator.

The second radar signal may comprise at least one echo associated with said at least one object in said environment, wherein the signal processing unit is further configured to supress the phase noise of each of the at least one echo in the second radar signal.

A benefit of this is that it allows for the radar system to perform corrections for a plurality of targets in different distances relative the radar system.

Further, the signal processing unit contains a function that estimates the phase noise that contaminates the second radar signal, by using the combined RF-oscillator signal and an estimating filter for estimating phase noise, the estimating filter being an autoregressive moving-average (ARMA) filter, an autoregressive (AR), filter, a moving-average (MA) filter, a bayesian filter or any other suitable estimating filter type.

The transmitter may be coupled to a second mixer unit configured to up-convert a signal prior to transmission and the receiver may be coupled to a third mixer unit configured to down-convert a received radar signal.

Further, the radar system may comprise a transmitting antenna coupled to the transmitter and a receiving antenna coupled to the receiver. In some embodiments, the antennas may be the same for the transmitter and the receiver. Furthermore, the time period may be a predetermined fixed time period.

The fixed time period may be set by a delay unit, wherein the delay unit is configured to set the time period such that a difference between an estimated phase noise and an actual phase noise is minimized for a plurality of working distances of the radar system. The delay unit may be a true time delay (TTD) filter.

A benefit of this is that the time period is based on the working distances of the radar system allowing it to be optimized. Further, since the time period is a fixed time period implemented in system design, it allows for a rapid correction of the receiver second signal.

There is also provided a vehicle comprising a radar system, the radar system comprising a radar module comprising a transmitter, a receiver, and a signal processing unit, a phase noise controller comprising an analog-to-digital converter, ADC, and an RF oscillator. The RF oscillator is configured to transmit RF oscillator signals to said phase noise controller and said radar module. The radar module is configured to transmit a first radar signal into an environment, wherein the radar signal is based on the RF oscillator signal, further, receive a second radar signal formed by reflections of the first radar signal from at least one object in said environment. The phase noise controller is configured to duplicate the RF oscillator signal, delay the duplicated RF oscillator signal by a time period, mix the RF oscillator signal and the delayed duplicated RF oscillator signal, so to obtain a combined RF oscillator signal and further digitize the combined RF oscillator signal by means of the ADC. The signal processing unit is configured to obtain the second radar signal and the combined RF oscillator signal, determine a phase noise of the second radar signal based on the second radar signal and the combined RF oscillator signal, supress the phase noise of the second radar signal based on the combined RF oscillator signal. The phase noise controller may further comprise a first mixer unit so to mix the RF oscillator signal and the delayed duplicated RF oscillator signal by means of the first mixer unit.

The radar system of the present disclosure is well adapted to handle any vibrations that occur by a vehicle. The vehicle may be an airborne vehicle, a ground vehicle or a ship.

There is further provided a method for supressing phase noise in a radar system. The radar system comprises a radar module comprising a transmitter, a receiver, and a signal processing unit, a phase noise controller comprising an analog-to-digital converter, ADC. The method comprises the steps of: transmitting a first radar signal into an environment, wherein the radar signal is based on a RF oscillator signal; receiving a second radar signal formed by reflections of the first radar signal from at least one object in said environment. Further, the method comprises duplicating the RF oscillator signal and delaying the duplicated RF oscillator signal by a time period. Furthermore, the method comprises mixing the RF oscillator signal and the delayed duplicated RF oscillator signal in order to obtain a combined RF oscillator signal. Also, the combined RF oscillator signal is digitized. Lastly, the method comprises obtaining the second radar signal and the combined RF oscillator signal and supressing the phase noise of the second radar signal based on the combined RF oscillator signal.

BRIEF DESCRIPTION OF THE DRAWINGS

In the following the disclosure will be described in a non-limiting way and in more detail with reference to exemplary embodiments and tests illustrated in the enclosed drawings, in which.

DETAILED DESCRIPTION

Figure 1:
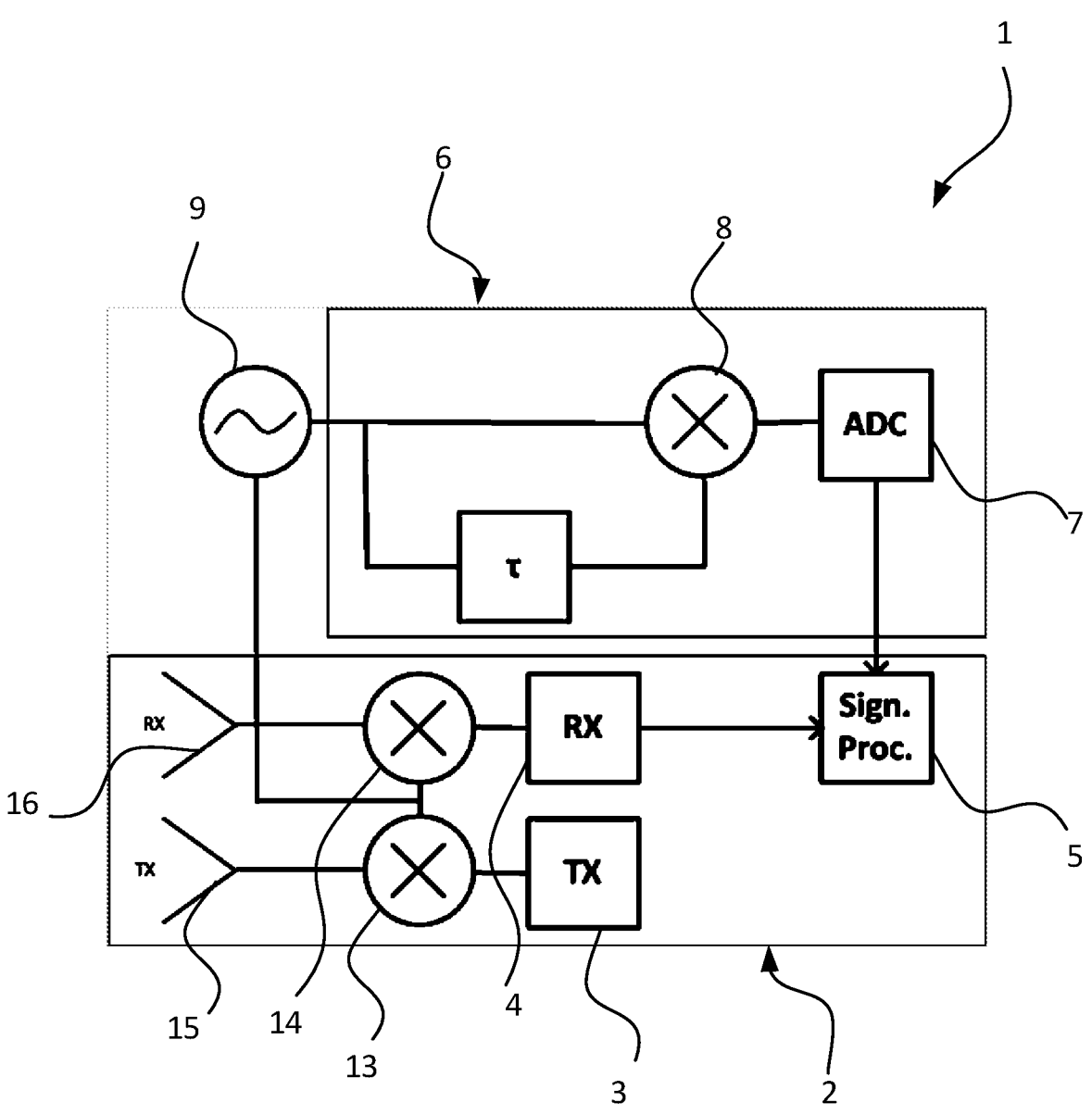
FIG. 1 schematically illustrates the radar system in accordance with an embodiment of the present disclosure

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided system, method and vehicle, it will be apparent to one skilled in the art that the system may be realized without these details. In other instances, well known constructions or functions are not described in detail, so as not to obscure the present disclosure.

In the following description of example embodiments, the same reference numerals denote the same or similar components.

FIG. 1 illustrates a radar system 1 for supressing phase noise arising from an RF oscillator 9 (i.e. a monostatic radar system) in accordance with an embodiment of the present disclosure. The radar system 1 in FIG. 1 comprises a radar module 2 comprising a transmitter 3, a receiver 4, and a signal processing unit 5. A phase noise controller 6 comprising an analog-to-digital converter, ADC 7, and a first mixer unit 8. The radar system 1 further comprises an RF oscillator 9. As seen in FIG. 1, there is a common RF oscillator 9 for both the transmitter 3 and the receiver 4.

The RF oscillator 9 is configured to transmit RF oscillator signals to said phase noise controller 6 and said radar module 2. The radar module 2 is configured to transmit at least a first radar signal into an environment, wherein the radar signal is based on the RF oscillator signal. Further, the radar module 2 is configured to receive at least a second radar signal formed by reflections of the first radar signal from at least one object in said environment. The phase noise controller 6 is configured to duplicate the RF oscillator signal, and delay the duplicated RF oscillator signal by a time period. Further, the phase noise controller 6 is configured to mix the RF oscillator signal and the delayed duplicated RF oscillator signal, e.g. by means of the first mixer unit 8, so to obtain a combined RF oscillator signal. Further, the phase noise controller 6 is configured to digitize the combined RF oscillator signal by means of the ADC and forward the signal to the signal processing unit 5. It should be noted that the present system 1 is for supressing phase noise arising from the RF oscillator 9. Accordingly, the phase noise controller 6 is configured to receive a raw RF oscillator signal from the RF oscillator 9. So to allow for supressing the phase noise arising from the RF oscillator 9. More specifically the system may be configured. Thus, the RF oscillator 9 may be an independent RF oscillator, directly connected to said phase noise controller 6 and directly connected to said radar module 2—by having an independent RF oscillator transmitting a raw signal the phase noise arising in the RF oscillator signal generated from the RF oscillator 9 may be estimated and supressed in accordance with the present disclosure.

Phase noise refers to random phase fluctuations in a signal, in the context of the present system, random phase fluctuations in the signal generated by the RF oscillator 9.

The RF oscillator 9 may generate a signal comprising a desired signal and noise. The desired signal is a stable frequency tone: $\beta_{LO} \cdot \cos(f_{LO}t + \alpha_{LO})$, where $\beta_{LO}$ is a complex number. The RF oscillator, including the desired signal and phase noise, can be written as: $s_9(t) = \beta_{LO} \cdot \cos(f_{LO}t + \alpha_{LO} + \phi(t))$, where $\phi(t)$ is unwanted phase noise. The signal $s_9(t)$ is the signal generated at the RF oscillator 9.

The signal created by the transmitter 3 (which may also be referred to as the waveform generator) on an intermediate frequency, $f_{IF}$ (which can be 0 or positive), is: $s_3(t) = g(t) \cdot \cos(f_{IF}t + \psi(t))$, where $g(t)$ is an envelope and (t) is the phase coded modulation of the radar signal. The signal $s_3(t)$ is the signal generated at the transmitter 3.

It should be noted that in some embodiments, the phase noise controller doesn't comprises a first mixer unit. Accordingly the phase noise controller may sample/generate the combined RF oscillator signal directly on the RF oscillator.

The signal processing unit 5 is configured to obtain at least the second radar signal and the combined RF oscillator signal and supress the phase noise of the second radar signal based on the combined RF oscillator signal.

According to some embodiments, the signal processing unit 5 may be configured to determine the phase noise of the second radar signal prior to supressing the second radar signal.

In accordance with the embodiment depicted in FIG. 1, the first mixer unit 8 is arranged to mix the delayed duplicated signal and the RF oscillator signal, prior to forwarding the combined RF oscillator signal to the ADC 7. Further, it should be noted that the second signal received by the receiving antenna 16 is forwarded to the signal processing unit 5 to be processed with the combined RF oscillator signal. The transmitter 3 may be coupled to a second mixer unit 13 configured to up-convert a signal prior to transmission and the receiver 4 may be coupled to a third mixer unit 14 configured to down-convert a received radar signal. The radar system 1 may further comprise a transmitting antenna 15 coupled to the transmitter 3 and a receiving antenna 16 coupled to the receiver 4. However, it should be noted that the radar system 1 may comprise additional suitable circuitry. E.g. the receiver 4 may also comprise an ADC to sample the signal.

The phase noise in the received second signal from a target, k may be defined as: $\xi_k(t) = \phi(t-C_k) - \phi(t)$, where $C_k$ is the delay due to the distance to target k. Further, the phase of the RF oscillator signal may be defined as $y(t) = \phi(t-\tau) - + n(t) \cdot \phi(t)$ defines the phase noise from the RF oscillator 9 and n(t) defines an added noise from the phase noise controller 6. For each delay, the phase noise $\xi_k(t)$ may be estimated ($\hat{\xi}_k(t)$) based on y(t), further, the second radar signal is multiplied with $e^{-i\widehat{\xi}_k(t)}$ so to supress the phase noise in accordance with the present disclosure.

In more detail, rearranging the equations above leads to: $\xi(t) - (t-\tau) = y(t) - n(t) - y(t-C) + n(t-C)$. Accordingly, given a measured signal y(t), an estimation of (t) may be performed by an estimating filter such as an ARMA-filter, AR, filter or an MA filter. Accordingly, the signal processing unit 5 may comprise one of an ARMA filter, an AR filter or a MA filter, a Bayesian filter or any other suitable filter for estimating and supressing the phase noise.

In the case of an AR, MA or ARMA-estimator, the phase noise may be estimated as: $\widehat{\xi}_k[m] = h_k * y[m]$, where * denotes convolution, for some filter $h_k$.

Figure 2:
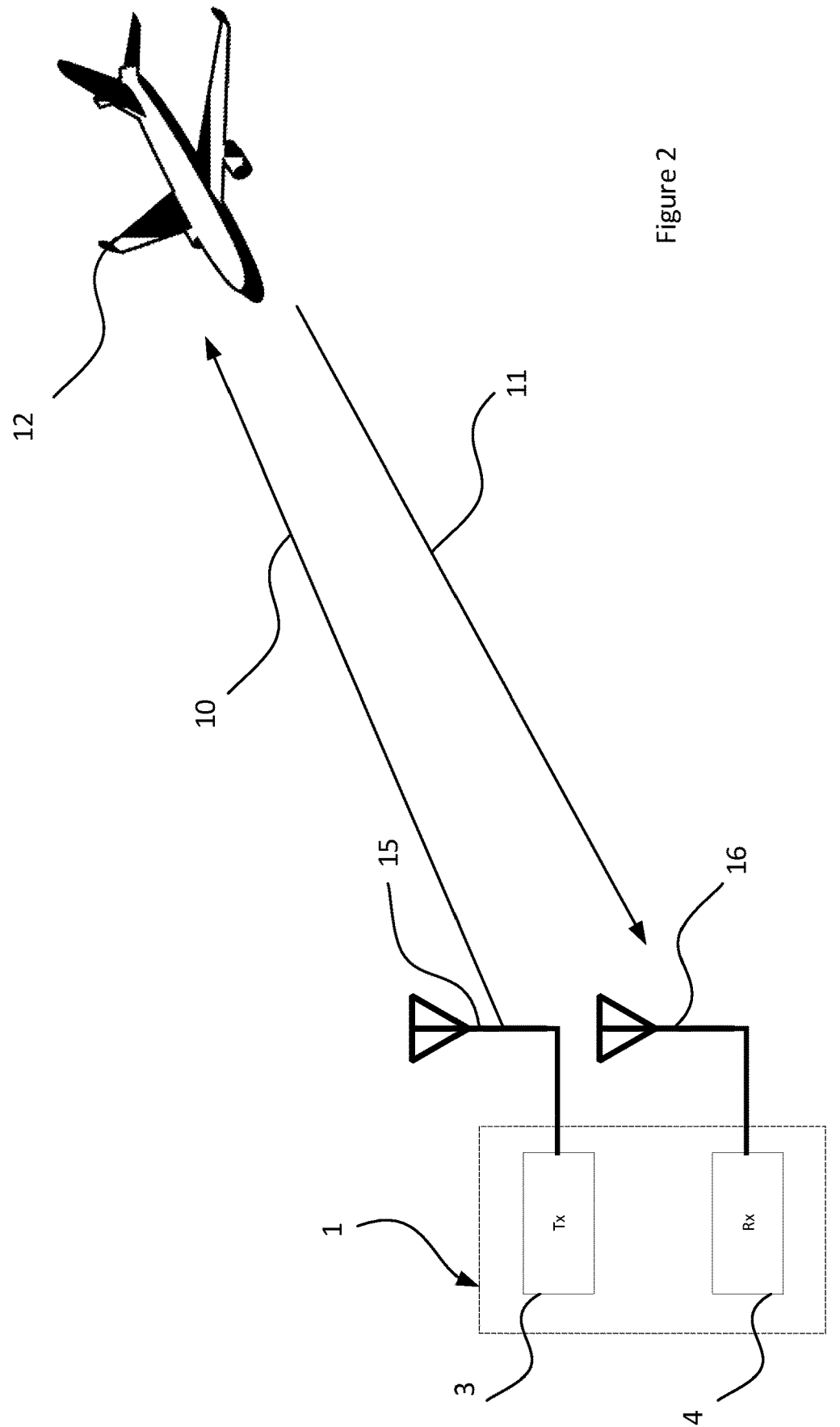
FIG. 2 illustrates the radar system transmitting a first signal and receiving a second signal FIG. 3 schematically shows a method for suppressing phase noise in accordance with an embodiment of the present disclosure FIG. 4 schematically illustrates a vehicle comprising a radar system in accordance with an embodiment of the present disclosure

FIG. 2 illustrates the radar system 1 for supressing phase noise arising from an RF oscillator 9 transmitting a first signal 10 into an environment, and further, receiving a second signal 11 formed by reflection of an object 12 in said environment. The second radar signal 11 may comprise a plurality of echoes, each associated with a plurality of objects 12 in said environment, wherein the signal processing unit 5 is further configured to supress the phase noise of each of the plurality of echoes in the second radar signal 11. It should be noted that in some embodiments, the antennas may be the same for the transmitter 3 and the receiver 4. The transmitter 3, which may also referred to as a waveform generator, generates a signal which is transmitted at a transmitter antenna port 15, said signal can be written as: $s_{15}(t) = g(t) \cdot \beta_{RF} \cdot \cos(f_{RF}t + \alpha_{LO} + \phi(t) + \psi(t))$, where $\beta_{RF}$ is a complex number and $f_{RF}$ is either $f_{RF} = f_{LO} + f_{IF}$ or $f_{RF} = f_{LO} - f_{IF}$. The signal $s_{15}(t)$ is the signal at port.

The RF oscillator signal (9) may be used both for up conversion at 13 and for down conversion in the receiver at 14. Thus, in the receiver after down conversion the modulation of the signal consists of the information carrying desired modulation plus unwanted phase noise, where the latter has been added twice, first in the up conversion and then in the down conversion. Accordingly, it's the unwanted phase noise that the system 100 may be configured to supress.

Conventionally, the phase noise causes a masking effect where noise induced by strong targets inhibits the ability to detect weak target. However, the radar system 1 in accordance with the present disclosure allows for the detection of strong and weak targets.

The term "time period" refers to the time period in which the duplicated RF oscillator signal is delayed by the phase noise controller 6. The time period may be a predetermined fixed time period. Further, the predetermined fixed time period may be set by a delay unit, wherein the delay unit is configured to set the time period such that a difference between an estimated phase noise and an actual phase noise is minimized for a plurality of working distances of the radar system 1. By using a fixed predetermined time period specifically adapted for the working distances of the radar, the system 1 allows for a rapid phase noise suppression for each second radar signal 11.

Figure 3:
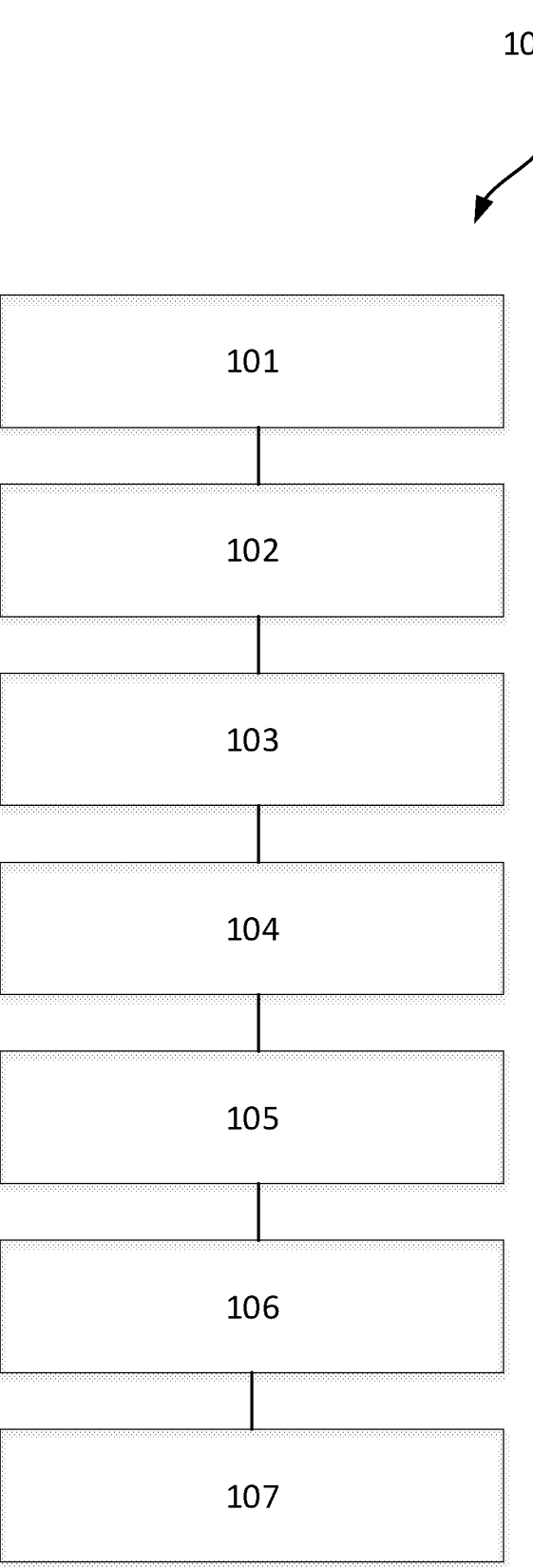

FIG. 3 schematically illustrates a method 100 for supressing phase noise in a radar system. The radar system comprises a radar module comprising a transmitter, a receiver, and a signal processing unit, a phase noise controller comprising an analog-to-digital converter, ADC, and a first mixer unit. The method comprises the steps of:

transmitting 101 a first radar signal into an environment, wherein the radar signal is based on a RF oscillator signal.

receiving 102 a second radar signal formed by reflections of the first radar signal from at least one object in said environment.

duplicating 103 the RF oscillator signal and delay 104 the duplicated RF oscillator signal by a time period.

mixing 105 the RF oscillator signal and the delayed duplicated RF oscillator signal to obtain a combined RF oscillator signal.

digitizing 106 the combined RF oscillator signal, further the method 100 comprises obtaining the second radar signal and the combined RF oscillator signal.

Furthermore, the method comprises the step of:

supressing 107 the phase noise of the second radar signal based on the combined RF oscillator signal.

The method may also comprise the step of determining the phase noise preceding the step of supressing the phase noise. It should be noted that the steps in the method 100 may also be performed in any other suitable order.

Figure 4:
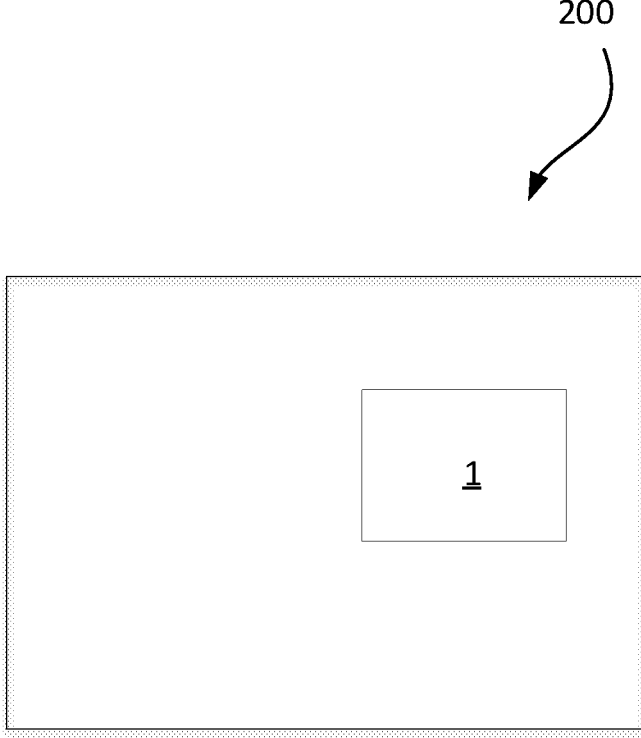

FIG. 4 schematically illustrates a vehicle 200 comprising a radar system 1, the radar system 1 comprising a radar module 2 comprising a transmitter 3, a receiver 4, and a signal processing unit 5, a phase noise controller 6 comprising an analog-to-digital converter, ADC 7, and a first mixer unit 8 and an RF oscillator 9. The RF oscillator 9 is configured to transmit RF oscillator signals to said phase noise controller 6 and said radar module 2. The radar module 2 is configured to transmit a first radar signal 10 into an environment, wherein the radar signal is based on the RF oscillator signal, further, receive a second radar signal 11 formed by reflections of the first radar signal 10 from at least one object 12 in said environment. The phase noise controller 6 is configured to duplicate the RF oscillator signal, delay the duplicated RF oscillator signal by a time period, mix the RF oscillator signal and the delayed duplicated RF oscillator signal by means of the first mixer unit 8, so to obtain a combined RF oscillator signal.

Digitize the combined RF oscillator signal by means of the ADC 7. The signal processing unit 5 is configured to obtain the second radar signal 11 and the combined RF oscillator signal, determine a phase noise of the second radar signal 11 based on the second radar signal 11 and the combined RF oscillator signal, supress the phase noise of the second radar signal 11 based on the combined RF oscillator signal.

The vehicle 200 may be any moving vehicle such as an airborne vehicle, a ship or a ground-vehicle.

Figure 5:
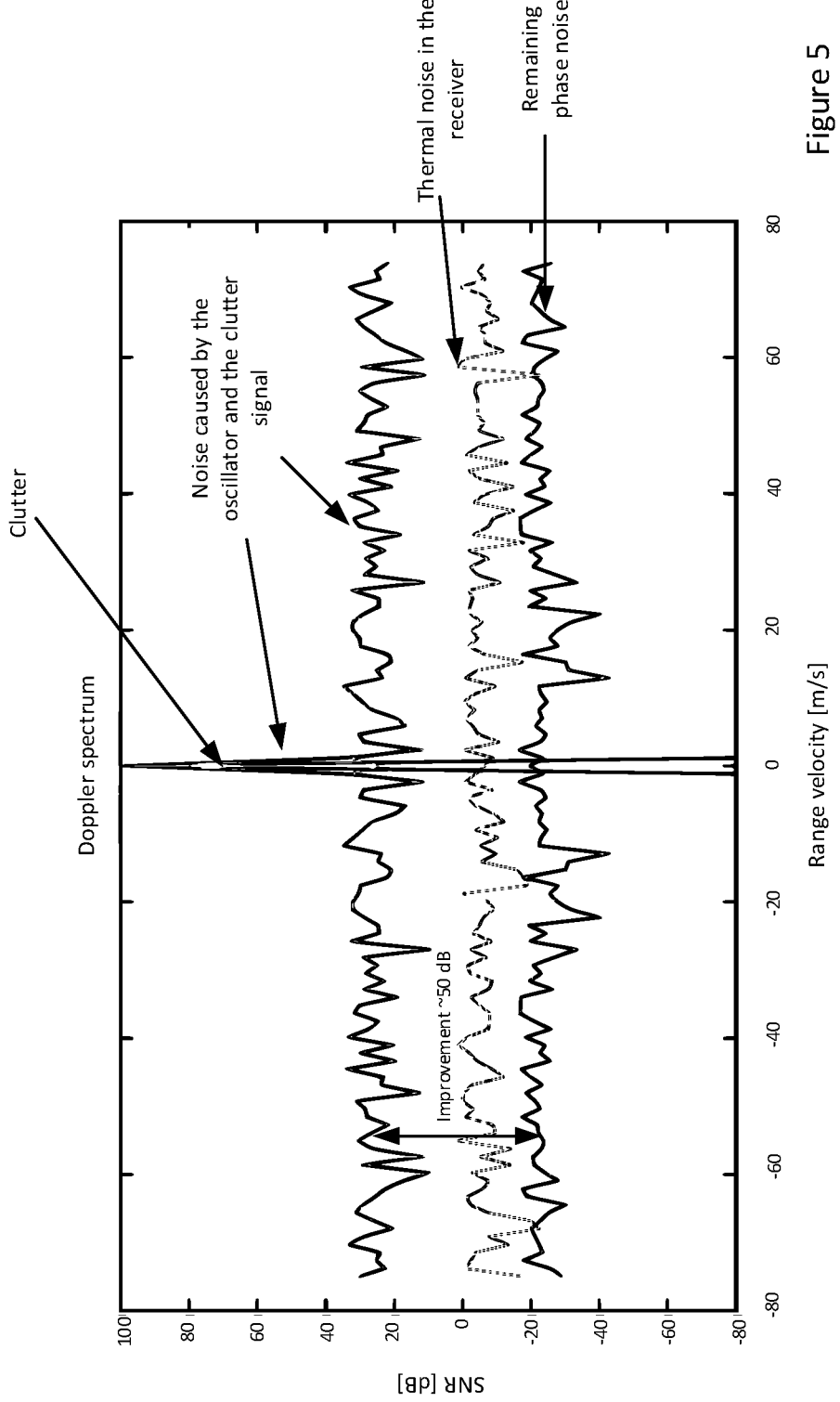
FIG. 5 shows a graph of a Doppler spectrum from a simulation of the radar system in accordance with an embodiment of the present disclosure FIG. 6 schematically illustrates a radar system comprising control circuitry and memory devices in accordance with an embodiment of the present disclosure

FIG. 5 illustrates a graph disclosing the Doppler spectrum caused by a clutter echo in accordance with a simulation of an embodiment in accordance with the present disclosure.

The purpose of the simulation is to further describe the disclosure as presented herein accompanied with advantages thereof. It should be noted that the simulation is based on an embodiment for a disclosing purpose, however it is not limited to said embodiment and may be varied within the present disclosure. The x-axis denotes range velocity and the y-axis denotes the signal-to-noise ratio. It is illustrated in FIG. 5 that the remaining phase noise after the suppression is improved with approximately 50 dB. In other words, the radar system 1 in accordance with the present disclosure provides a significant phase noise reduction.

Figure 6:
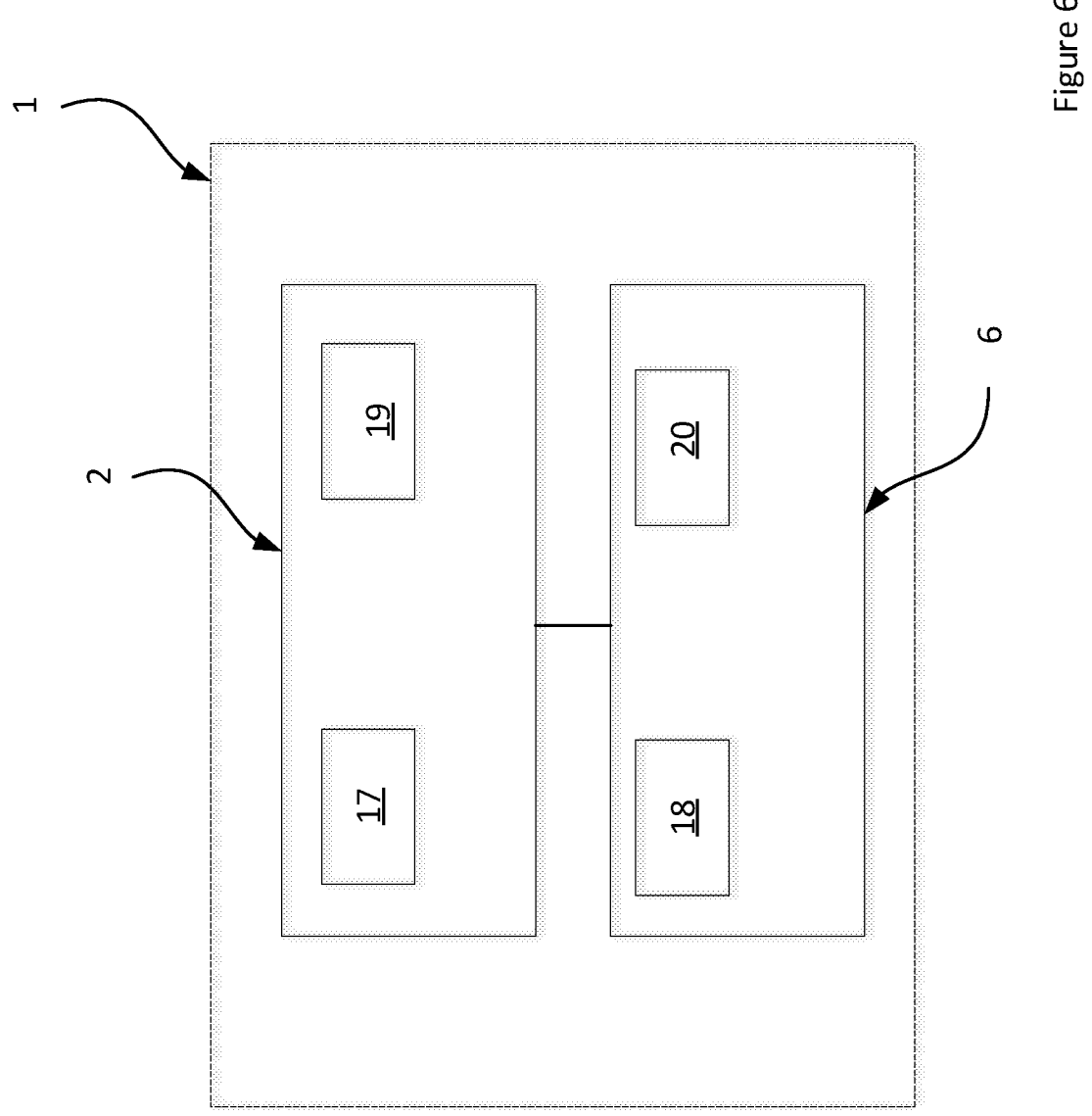

FIG. 6 schematically discloses a radar system 1 in accordance with an embodiment of the present disclosure. As shown in FIG. 6, the radar system 1 may have memory device 17, 18 to store computer-executable instructions that are executable by a processing device for processing the signals in order to determine range, velocity and location of objects. A memory device 19, 20 may also be used to store information about objects in the environment. The radar system 1 may be connected to a network via an Ethernet connection or other types of network connections.

As further depicted in FIG. 6, the radar module 2 and the phase noise controller 6 may each comprise control circuitry 17, 18 and one or more memory devices 19, 20. The memory devices 19, 20 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 17, 18. Each memory device 19, 20 may store any suitable instructions, data or information, including a computer program, software, an application including one or more of logic, rules, code, tables, etc. and/or other instructions capable of being executed by the control circuitry and, utilized. Memory device 19, 20 may be used to store any calculations made by control circuitry 17, 18 and/or any data received via interface. In some embodiments, each control circuitry 17, 18 and each memory device 19, 20 may be considered to be integrated. Each memory device 19, 20 may also store data that can be retrieved, manipulated, created, or stored by the control circuitry 17, 18.

The control circuitry 17, 18 may include, for example, one or more central processing units (CPUs), graphics processing units (GPUs) dedicated to performing calculations, and/or other processing devices. The memory device 19, 20 can include one or more computer-readable media and can store information accessible by the control circuitry 17, 18 including instructions/programs that can be executed by the control circuitry 17, 18.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The invention claimed is:

1. A monostatic radar system comprising:
a radar module comprising a transmitter, a receiver, and a signal processing circuit;
a phase noise controller comprising a first analog-to-digital converter (ADC);
a radio frequency (RF) oscillator configured to:
transmit RF oscillator signals to said phase noise controller and said radar module, wherein the radar module is configured to:
transmit at least a first radar signal into an environment, wherein the radar signal is based on the RF oscillator signal,
receive, in the receiver, at least a second radar signal formed by reflections of the first radar signal from at least one object in said environment, wherein the receiver comprises a second ADC;
digitize the received second radar signal by means of the second ADC, wherein the phase noise controller is configured to:
duplicate the RF oscillator signal;
delay the duplicated RF oscillator signal by a time period;
mix the RF oscillator signal and the delayed duplicated RF oscillator signal, so to obtain a combined RF oscillator signal;
digitize the combined RF oscillator signal by means of the first ADC, wherein the signal processing circuit is configured to:
obtain at least the digitized second radar signal and the digitized combined RF oscillator signal, wherein the digitized second radar signal and the digitized combined RF oscillator signal are obtained separately; and
suppress the phase noise of the digitized second radar signal based on the digitized combined RF oscillator signal.

2. The monostatic radar system according to claim 1, wherein the phase noise controller further comprises a first RF mixer, wherein the first RF mixer is configured to mix the RF oscillator signal and the delayed duplicated RF oscillator signal, so to obtain the combined RF oscillator signal.

3. The monostatic radar system according to claim 1, wherein the second radar signal comprises at least one echo associated with said at least one object in said environment, wherein the signal processing circuit is further configured to suppress the phase noise of each of the at least one echo in the second radar signal.

4. The monostatic radar system according to claim 1, wherein the signal processing circuit comprises an estimating filter for estimating phase noise, the filter being an autoregressive moving-average (ARMA) filter, an autoregressive, (AR) filter, a moving-average (MA) filter or a bayesian filter.

5. The monostatic radar system according to claim 1, wherein the transmitter is coupled to a second RF mixer configured to up-convert a signal prior to transmission and the receiver is coupled to a third RF mixer configured to down-convert a received radar signal.

6. The monostatic radar system according to claim 1, wherein the monostatic radar system further comprises at least one transmitting antenna coupled to the transmitter and at least one receiving antenna coupled to the receiver.

7. The monostatic radar system according to claim 1, wherein the time period is a predetermined fixed time period.

8. The monostatic radar system according to claim 7, wherein the predetermined fixed time period is set by a delay circuit, wherein the delay circuit is configured to set the time period such that a difference between an estimated phase noise and an actual phase noise is minimized for a plurality of working distances of the monostatic radar system.

9. The monostatic radar system according to claim 1, wherein the transmitted RF oscillator signals to said phase noise controller and said radar module are raw RF oscillator signals.

10. The monostatic radar system according to claim 9, wherein the RF oscillator is an independent RF oscillator, directly connected to said phase noise controller and directly connected to said radar module.

11. A vehicle comprising a monostatic radar system, the monostatic radar system comprising:
a radar module comprising a transmitter, a receiver, and a signal processing circuit;
a phase noise controller comprising a first analog-to-digital converter (ADC);
a radio frequency (RF) oscillator configured to:
transmit RF oscillator signals to said phase noise controller and said radar module,
wherein the radar module is configured to:
transmit a first radar signal into an environment, wherein the radar signal is based on the RF oscillator signal,
receive, in the receiver, a second radar signal formed by reflections of the first radar signal from at least one object in said environment, wherein the receiver comprises a second ADC:
digitized the received second radar signal by means of the second ADC, wherein the phase noise controller-is configured to:
duplicate the RF oscillator signal;
delay the duplicated RF oscillator signal by a time period;
mix the RF oscillator signal and the delayed duplicated RF oscillator signal, so to obtain a combined RF oscillator signal;
digitize the combined RF oscillator signal by means of the first ADC wherein the signal processing circuit is configured to:
obtain the digitized second radar signal and the digitized combined RF oscillator signal wherein the digitized second radar signal and the digitized combined RF oscillator signal are obtained separately;
determine a phase noise of the second radar signal based on the second radar signal and the combined RF oscillator signal; and
suppress the phase noise of the digitized second radar signal based on the digitized combined RF oscillator signal.

12. A method for suppressing phase noise in a monostatic radar system, the method comprising:
transmitting a first radar signal into an environment, wherein the radar signal is based on a radio frequency (RF) oscillator signal;
receiving a second radar signal formed by reflections of the first radar signal from at least one object in said environment;
digitizing the received second radar signal by means of a first analog-to-digital converter (ADC)
duplicating the RF oscillator signal;
delaying the duplicated RF oscillator signal by a time period;

mixing the RF oscillator signal and the delayed duplicated RF oscillator signal, so to obtain a combined RF oscillator signal;

digitizing the combined RF oscillator signal by means of a second analog-to-digital converter (ADC);

obtaining the digitized second radar signal and the digitized combined RF oscillator signal, wherein the digitized second radar signal and the digitized combined RF oscillator signal are obtained separately; and suppressing the phase noise of the digitized second radar signal based on the digitized combined RF oscillator signal.

* * * * *